United States Patent
Kurahashi (10) Patent No.: US 8,433,046 B2
(45) Date of Patent: Apr. 30, 2013

(54) LINE CONTROL APPARATUS, LINE CONTROL METHOD, AND COMPUTER-READABLE STORAGE MEDIUM

(75) Inventor: Masahiro Kurahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1164 days.

(21) Appl. No.: 12/277,001

(22) Filed: Nov. 24, 2008

(65) Prior Publication Data

US 2009/0154673 A1    Jun. 18, 2009

(30) Foreign Application Priority Data

Dec. 14, 2007    (JP) .................................. 2007-323680

(51) Int. Cl.
*H04M 11/00* (2006.01)
*H04M 1/00* (2006.01)

(52) U.S. Cl.
USPC .................. 379/93.09; 379/93.11; 379/93.05; 379/100.01; 379/100.15; 379/376.02; 379/377; 379/422

(58) Field of Classification Search ............... 379/93.01, 379/93.05–93.07, 93.09, 93.11, 100.01, 100.05, 379/100.12, 100.15, 422–423, 376.02, 377
See application file for complete search history.

(56) References Cited

U.S. PATENT DOCUMENTS

| | | | | |
|---|---|---|---|---|
| 5,086,455 | A | * | 2/1992 | Satomi et al. ............. 379/100.16 |
| 5,666,403 | A | * | 9/1997 | Telibasa ..................... 379/93.09 |
| 5,809,132 | A | * | 9/1998 | Sakamoto .................... 379/377 |
| 5,877,872 | A | * | 3/1999 | Nomura et al. ................ 358/468 |
| 5,892,815 | A | * | 4/1999 | Yoshida et al. .......... 379/100.16 |
| 5,909,488 | A | * | 6/1999 | Koizumi et al. ......... 379/376.02 |
| 5,974,123 | A | * | 10/1999 | Nakayama et al. ...... 379/100.16 |
| 6,075,847 | A | * | 6/2000 | Leung ....................... 379/100.17 |
| 6,968,045 | B1 | * | 11/2005 | Cannon et al. ............. 379/93.09 |
| 7,145,992 | B2 | * | 12/2006 | Orikasa et al. ............. 379/93.29 |
| 7,684,383 | B1 | * | 3/2010 | Thompson et al. ........... 370/352 |
| 7,787,603 | B2 | * | 8/2010 | Ito .............................. 379/93.23 |

FOREIGN PATENT DOCUMENTS

JP                05-030272  A        2/1993

* cited by examiner

*Primary Examiner* — George Eng
*Assistant Examiner* — Nam Huynh
(74) *Attorney, Agent, or Firm* — Canon U.S.A., Inc. IP Division (57) ABSTRACT

A line control apparatus having a first interface for connecting to a telephone line, a second interface for connecting to a facsimile apparatus, and a third interface for connecting to a telephone, includes: a first detecting unit that detects a calling signal transmitted from the telephone line and a second detecting unit configured to detect a signal from the telephone line, such signal having a voltage lower than a voltage that the first detecting unit can detect. In accordance with the second detecting unit having detected a signal from the telephone line, the control unit switches from a state wherein the first interface and the third interface are connected to a state of not being connected.

19 Claims, 10 Drawing Sheets

LINE CONTROL APPARATUS, LINE CONTROL METHOD, AND COMPUTER-READABLE STORAGE MEDIUM

BACKGROUND OF THE INVENTION

1. Field of the Invention

The present invention relates to a line control apparatus connected to a telephone line, facsimile line, and telephone, and the line control method, and computer-readable storage medium thereof.

2. Description of the Related Art

In recent years, a facsimile apparatus has been used which has a function to automatically respond without ringing a ringing bell in the case of an incoming facsimile (non-ringing incoming mode), in order to avoid unnecessary ringing of the ringing bell of a telephone when a facsimile comes in.

Figure 9:
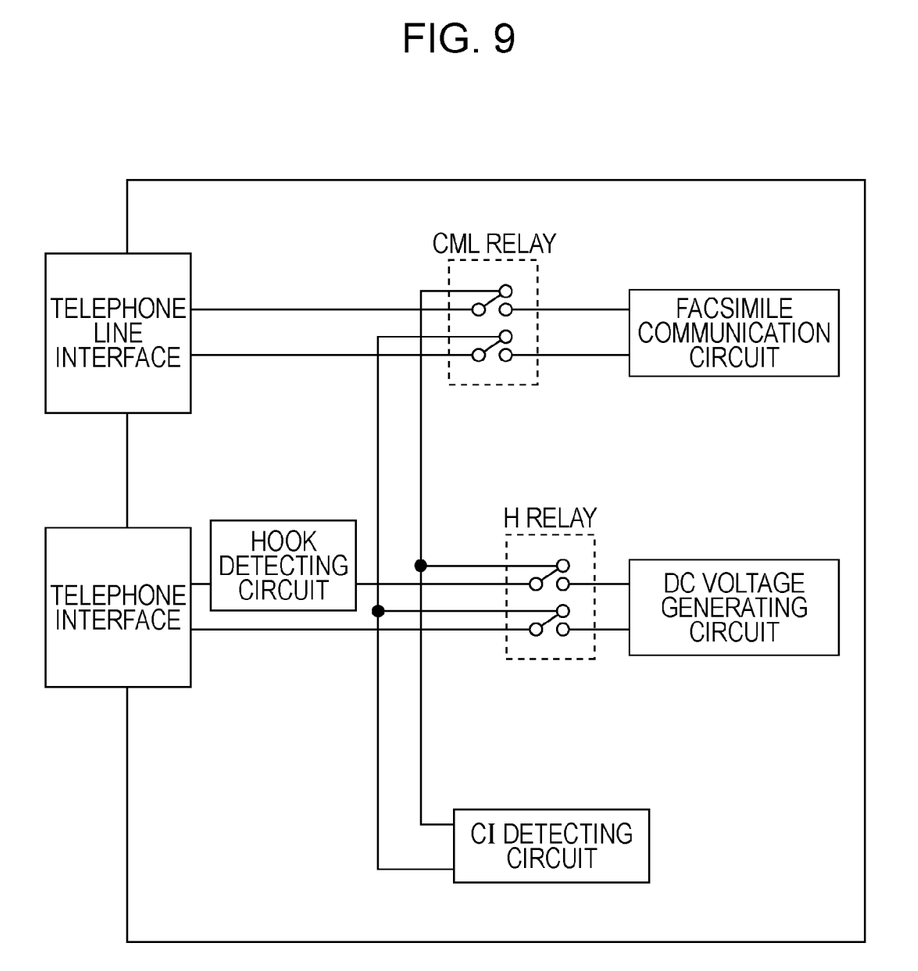
FIG. 9 is a block diagram illustrating a conventional NCU.

FIG. 9 illustrates an NCU (network control unit) of a facsimile apparatus in a standby state in the case of a situation wherein ringing incoming mode is set (non-ringing incoming mode is not set). In the example shown in FIG. 9, a CML relay and H relay are both in an off state (a state wherein voltage is not applied to the relay), and a telephone line interface and telephone interface are connected.

In the case of a facsimile arriving in the state that the ringing incoming mode is set, a signal from the telephone line is transmitted to the telephone in accordance with a calling signal (CI signal) being detected in a CI signal detecting circuit, and the telephone rings. Upon the user instructing facsimile receiving, the CML relay becomes in the on state (a state wherein voltage is applied to the relay), and the telephone line interface and facsimile communication circuit are connected.

Figure 10:
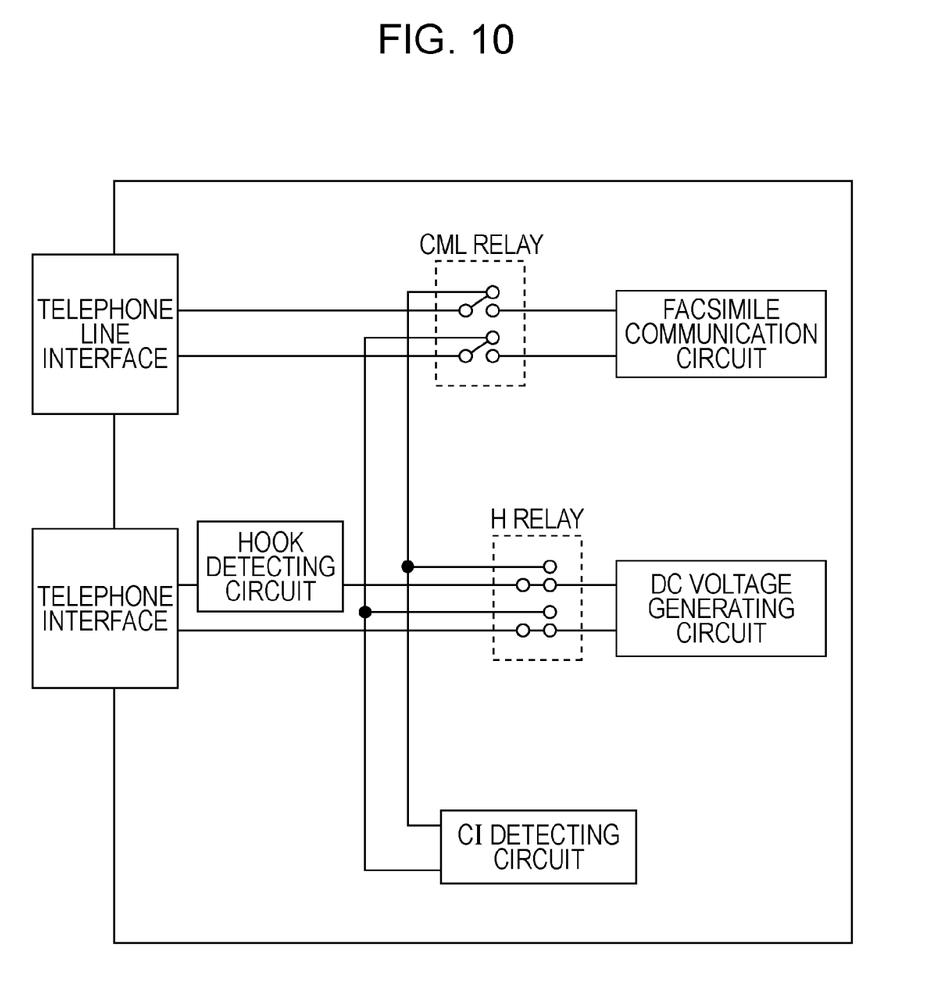
FIG. 10 is a block diagram illustrating a conventional NCU.

Conversely, FIG. 10 illustrates an NCU state in the case that non-ringing incoming mode is set. In the example shown in FIG. 10, the CML relay is in the off state, and the H relay is in the on state. That is to say, the telephone interface is not connected to the telephone line interface.

In the case of an incoming facsimile in this state, the CML relay becomes in the on state in accordance with a CI signal being detected in the CI signal detecting circuit, and the telephone line interface and facsimile communication circuit are connected. In the case that a CNG (calling tone) signal is detected in the facsimile communication circuit, the facsimile communication circuit executes the facsimile communication.

On the other hand, in the case that a CNG signal is not detected in the facsimile communication circuit, the CML relay and H relay are both in the off state, and the telephone line interface and telephone interface are connected. Thus, facsimile data can be automatically received without ringing the telephone in the case of an incoming facsimile, and in the case of incoming for voice communication, the telephone is enabled to ring to notify the user.

However, in the case of realizing the non-ringing incoming mode with the above-described method, problems such as those below can occur. That is to say, in the case of the above-described method, in a standby state the H relay must be constantly left in the on state. Therefore, power to operate the H relay is necessary, whereby power consumption is increased for the facsimile apparatus in the standby state.

Also, on the other hand, an arrangement may be considered wherein the state of the H relay telephone line interface and telephone interface being connected is in the on state, and state wherein the telephone line interface and telephone interface not being connected is in the off state. However in this case, power necessary for the standby of the above-described non-ringing incoming mode can be suppressed, but power to connect the telephone interface to the telephone line interface becomes necessary. In such a case, if the power source of the facsimile apparatus unit is turned off by a power outage for example, the telephone interface cannot be connected to the telephone line interface, whereby communication cannot be made.

In order to resolve this problem, a method disclosed in Japanese Patent Laid-Open No. 05-030272 is considered. According to the method disclosed in Japanese Patent Laid-Open No. 05-030272, in the standby state the call-out portion and line are in a connected state, and the call-out portion and line are disconnected in accordance with a CI signal pattern that is correct to a certain degree being detected before a formal CI signal from the line being detected. Thus, a non-ringing incoming mode can be realized while power consumption in the waiting state is suppressed.

However, in the case of realizing the non-ringing incoming mode using the method disclosed in Japanese Patent Laid-Open No. 05-030272, problems such as described below can occur. That is to say, with the method disclosed in Japanese Patent Laid-Open No. 05-030272, the CI detecting unit detects a signal from the line, and a disconnecting unit disconnects the line and call-out portion in accordance with determination that the signal thereof is a CI signal pattern that is correct to a certain degree. Determination is subsequently made formally as to whether or not the signal thereof is a CI signal. With this method, following the disconnecting unit disconnecting the line and call-out portion, the signal from the line is not transmitted to the call-out portion, and the ringing of the ringing bell can be prevented.

However, with the method disclosed in Japanese Patent Laid-Open No. 05-030272, the line and call-out portion are disconnected before the formal CI signal is detected, but during the time from the time that the signal is begun to be transmitted from the line until the call-out portion is disconnected, the signal from the line is still transmitted to the call-out portion. That is to say, regardless that the incoming call is an incoming facsimile, the call-out portion still rings, and the user can mistake the incoming for an incoming telephone call.

The present invention is made to resolve the above-described problems, and enables power necessary for the standby state to be suppressed, while providing a line control apparatus that prevents unnecessary ringing of the telephone at the time of an incoming facsimile, and the line control method, and computer-readable storage medium thereof.

SUMMARY OF THE INVENTION

The present invention provides for a communication apparatus and a control method thereof which overcomes the above-described problem.

A line control apparatus having a first interface for connecting to a telephone line, a second interface for connecting to a facsimile apparatus, and a third interface for connecting to a telephone, includes: a first detecting unit configured to detect a calling signal transmitted from the telephone line; a first switching unit configured to switch a connection state between the first interface and the third interface; a second detecting unit configured to detect a signal from the telephone line, such signal having a voltage lower than a voltage that the first detecting unit can detect; and a control unit configured to control the first switching unit so as to switch from a state wherein the first interface and the third interface are connected to a state of not being connected, in accordance with the second detecting unit having detected the signal from the telephone line.

A line control method for a line control apparatus having a first interface for connecting to a telephone line, a second interface for connecting to a facsimile apparatus, and a third interface for connecting to a telephone, includes: a first detecting process arranged to detect a calling signal transmitted from the telephone line; a first switching process arranged to switch a connection state between the first interface and the third interface; a second detecting process arranged to detect a signal from the telephone line, such signal having a voltage lower than a voltage that can be detected with the first detecting process; and a control process arranged to control the first switching process so as to switch from a state wherein the first interface and the third interface are connected to a state of not being connected, in accordance with the signal from the telephone line having been detected by the second detecting process.

Further features of the present invention will become apparent from the following description of exemplary embodiments with reference to the attached drawings.

BRIEF DESCRIPTION OF THE DRAWINGS

The accompanying drawings, which are incorporates in and constitute a part of the specification, illustrate embodiments of the invention and, together with the description, serve to explain the principle of the invention.

DESCRIPTION OF THE EMBODIMENTS

Embodiments of the present invention will be described below.

Figure 1:
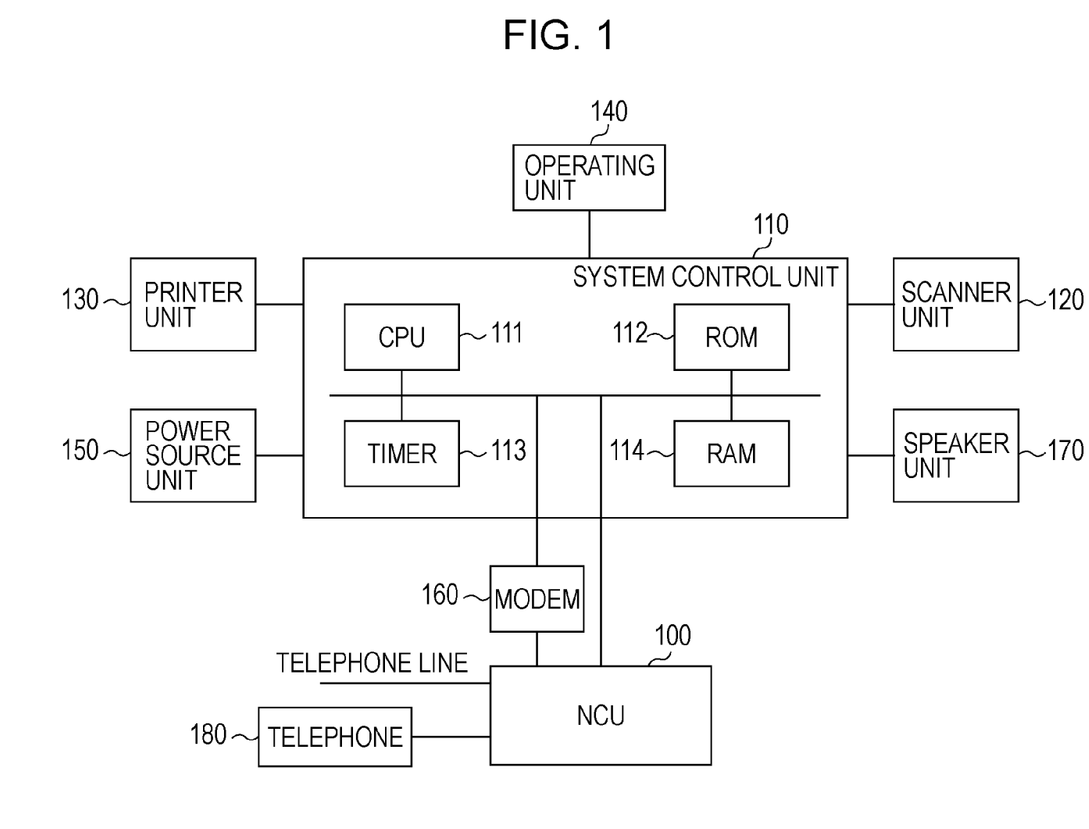
FIG. 1 is a block diagram illustrating an overall configuration of a facsimile apparatus according to an embodiment of the present invention.

FIG. 1 shows a block diagram of an overall configuration of a facsimile apparatus. An NCU 100 switches between connecting a telephone line and a telephone 180 provided external to the facsimile apparatus, and connecting the telephone line and the facsimile apparatus main unit.

A modem 160 performs processing to modulate/demodulate an image signal transmitted/received via a telephone line. A speaker unit 170 outputs audio, and notifies the user of an incoming telephone call or facsimile.

A system control unit 110 has a CPU 111, ROM 112, timer 113, and RAM 114. The CPU 111 reads out and executes a program stored in the ROM 112, and controls the entire facsimile apparatus. The RAM 114 stores images received with the facsimile communication. The timer 113 measures time.

A scanner unit 120 reads a document and outputs image data to the system control unit 110. An operating unit 140 has a liquid crystal display unit for performing various types of displays and a key input unit to receiving various types of instructions from the user, and so forth. A printer unit 130 prints images that are received as a facsimile or images that are copied and output on recording paper. A power source unit 150 supplies power to the facsimile apparatus.

Figure 2:
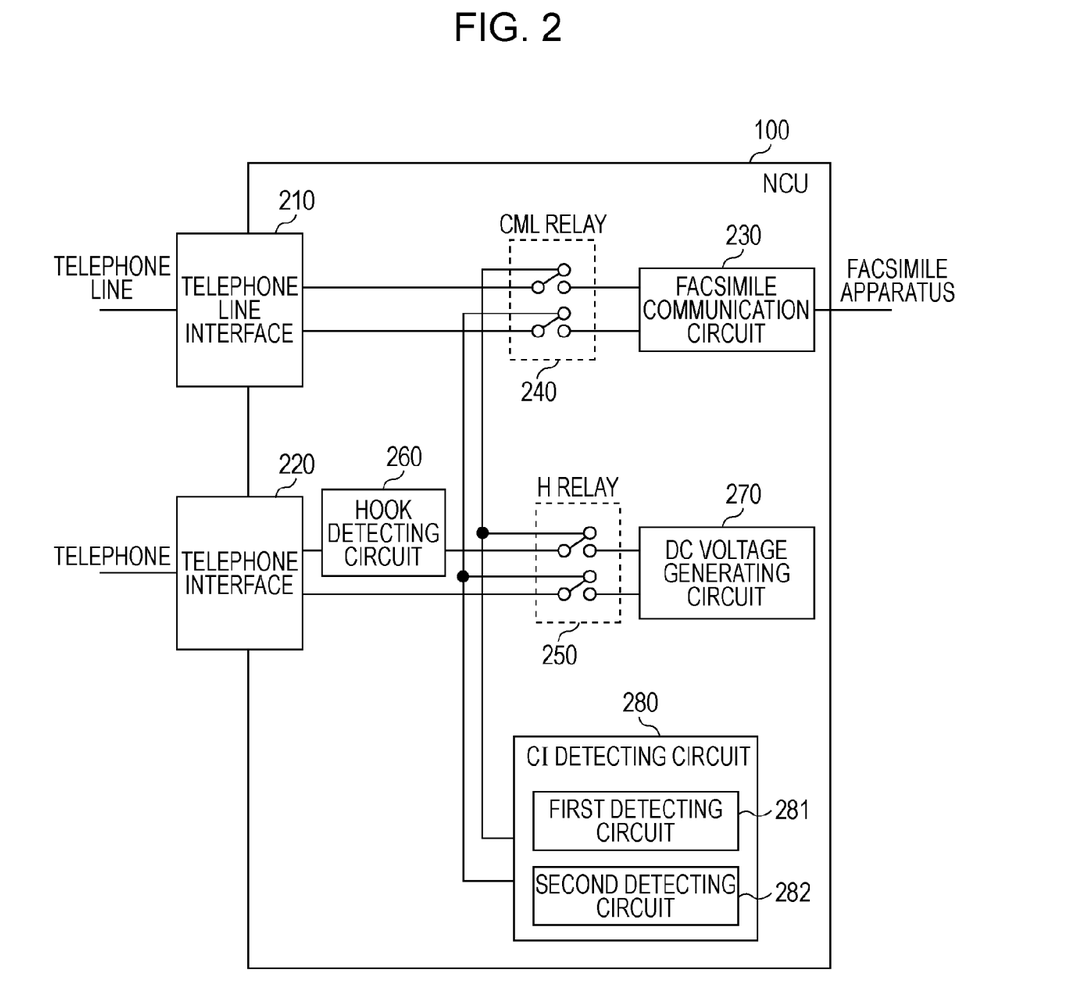
FIG. 2 is a block diagram illustrating a configuration of an NCU according to an embodiment of the present invention.

FIG. 2 is a diagram showing a configuration of an NCU 100 that functions as a line control apparatus according to the present invention. A telephone line interface 210 that functions as a first interface connects a telephone line and the NCU 100.

A facsimile communication circuit 230 that functions as a second interface connects the modem 160 or facsimile apparatus main unit and the NCU 100. A CML relay 240 that functions as a second switching unit (second relay) switches the connection state between the telephone line interface 210 and the facsimile communication circuit 230. The CML relay 240, when in the on state, connects the telephone line interface 210 and facsimile communication circuit 230. Also, the CML relay 240, when in the off state, connects the telephone line interface 210 and telephone interface 220 or the later-described CI detecting circuit.

The telephone interface 220 that functions as a third interface connects the telephone 180 and NCU 100. The hook detecting circuit 260 detects on-hook or off-hook of the telephone 180. A DC voltage generating circuit 270 generates the voltage necessary for the hook detecting circuit 260 to detect the on-hook or off-hook of the telephone 180.

An H relay 250 that functions as a first switching unit (first relay) switches the connection state of the telephone line interface 210 and the telephone interface 220. The H relay 250, when in the on state, connects the telephone interface 220 and DC voltage generating circuit 270. Note that at this time the telephone 180 is not connected to the telephone line. Also, the H relay 250, when in the off state, connects the telephone interface 220 and telephone line interface 210.

With the example shown in FIG. 2, the CML relay 240 and H relay 250 are both in the off state, and the telephone 180 is connected to the telephone line. A CI detecting circuit 280 has a first detecting circuit 281 that functions as a first detecting unit and a second detecting circuit 282 that functions as a second detecting unit. Note that the first detecting circuit 281 and second detecting circuit 282 which mutually differ are disposed so as to be connected in parallel.

Also, the system control unit 110 that functions as a determining unit determines, based on the voltage and pattern of signals transmitted from the telephone line and output from the first detecting circuit 281, whether or not such signal is a CI signal. The second detecting circuit 282 detects a signal with a lower voltage than the voltage which the first detecting circuit 281 can detect.

Figure 3:
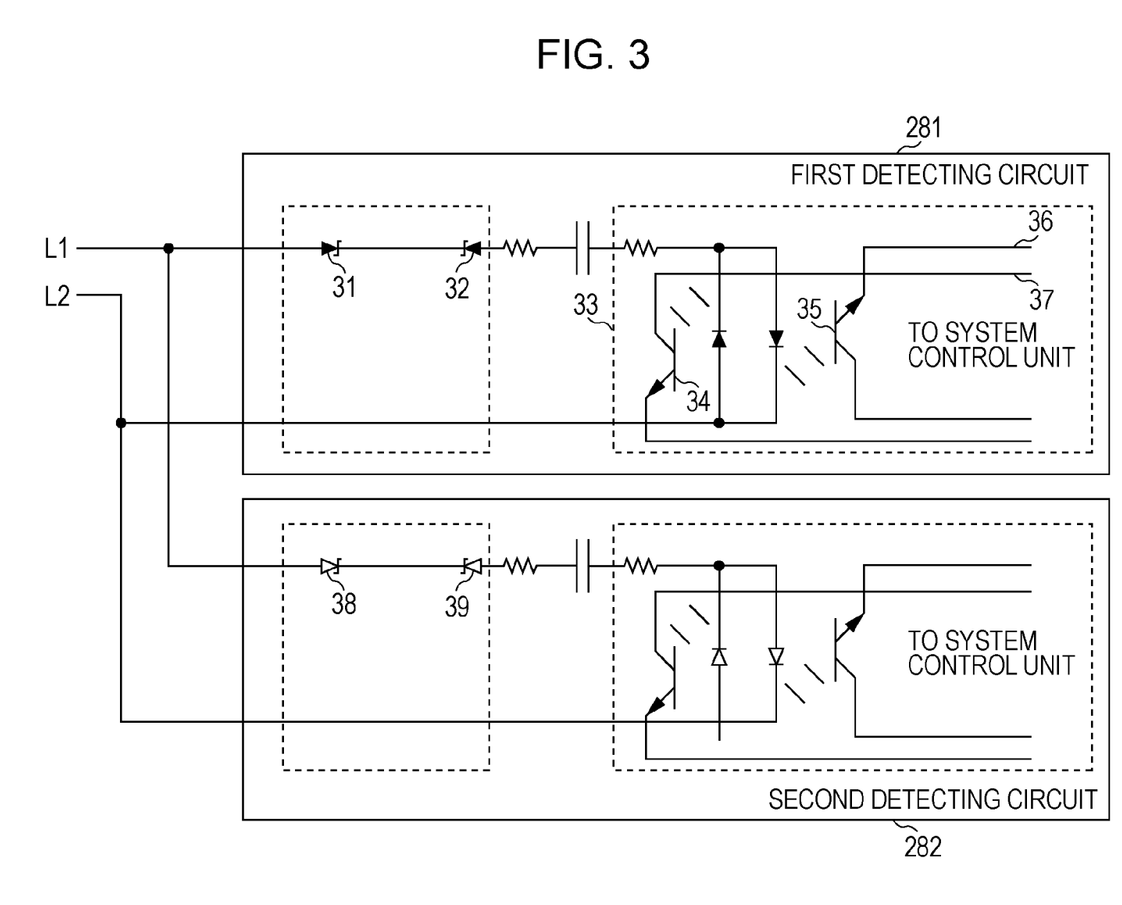
FIG. 3 is a block diagram illustrating a configuration of a CI detecting circuit according to an embodiment of the present invention.

FIG. 3 shows a configuration of the CI detecting circuit 280. A line pair made up of L1 and L2 are each connected to the telephone line, and in the case that a facsimile or telephone call comes in, a CI signal which is a sine wave is transmitted. Note that for example in Japan, a sine wave of 75V/16 Hz effective value is transmitted.

With zener diodes 31 and 32, noise is removed by removing the signal having a voltage lower than a predetermined voltage. Note that signals of less than 30V are removed here with the zener diodes 31 and 32, but modifications to the value may be made as appropriate according to country/region and so forth.

Also, the CI signal is an alternating current signal, whereby the CI signal can be detected in a sure manner regardless of which pole the signal is input from, whereby the zener diodes 31 and 32 are provided in a pair as shown in the diagram in a plus direction and minus direction.

With the zener diodes 31 and 32, following the signals of less than 30V being removed, voltage is applied to a detecting block 33 which is surrounded with a broken line in the diagram. Following this, voltage is applied to photo-couplers 34 and 35 via a condenser and resistor. Note that a condenser cuts the direct current components, so the resistor is for the purpose of controlling the current flowing into the photo-coupler and to correspond to an impedance standard.

Further, current flows on the diode side of the photo-couplers 34 and 35, and by the photo-transistor turning on, the signal is transmitted to the system control unit 110 via the signal lines 36 and 37. Note that an arrangement may be made wherein only one photo-couple is used, and the polarity on only one side is detected. The above description is the configuration of the first detecting circuit 281.

Next, the second detecting circuit 282 will be described. The configuration of the second detecting circuit 282 is the same as the first detecting circuit 281 with the exceptions of the zener diodes 38 and 39, so the description thereof will be omitted.

The zener diodes 38 and 39 are set so as to remove signals of voltage lower than the zener diodes 31 and 32. Therefore the second detecting circuit 282 detects a signal with a voltage lower than the voltage which the first detecting circuit 281 can detect.

Let us say that signals of less than 5V will be removed here with the zener diodes 38 and 39. That is to say, the zener diodes 38 and 39 transmit signals of 5V and greater to the downstream side. Therefore, the second detecting circuit 282 detects voltage signals far lower than the voltage that the first detecting circuit can detect and voltage lower than the voltage whereby the telephone 180 rings.

Also, as a configuration to detect voltage signals lower than voltage of the first detecting circuit 281, the zener diodes 38 and 39 are employed here which differs from the zener diodes 31 and 32 of the first detecting circuit 281, but another method may be employed.

Figure 4:
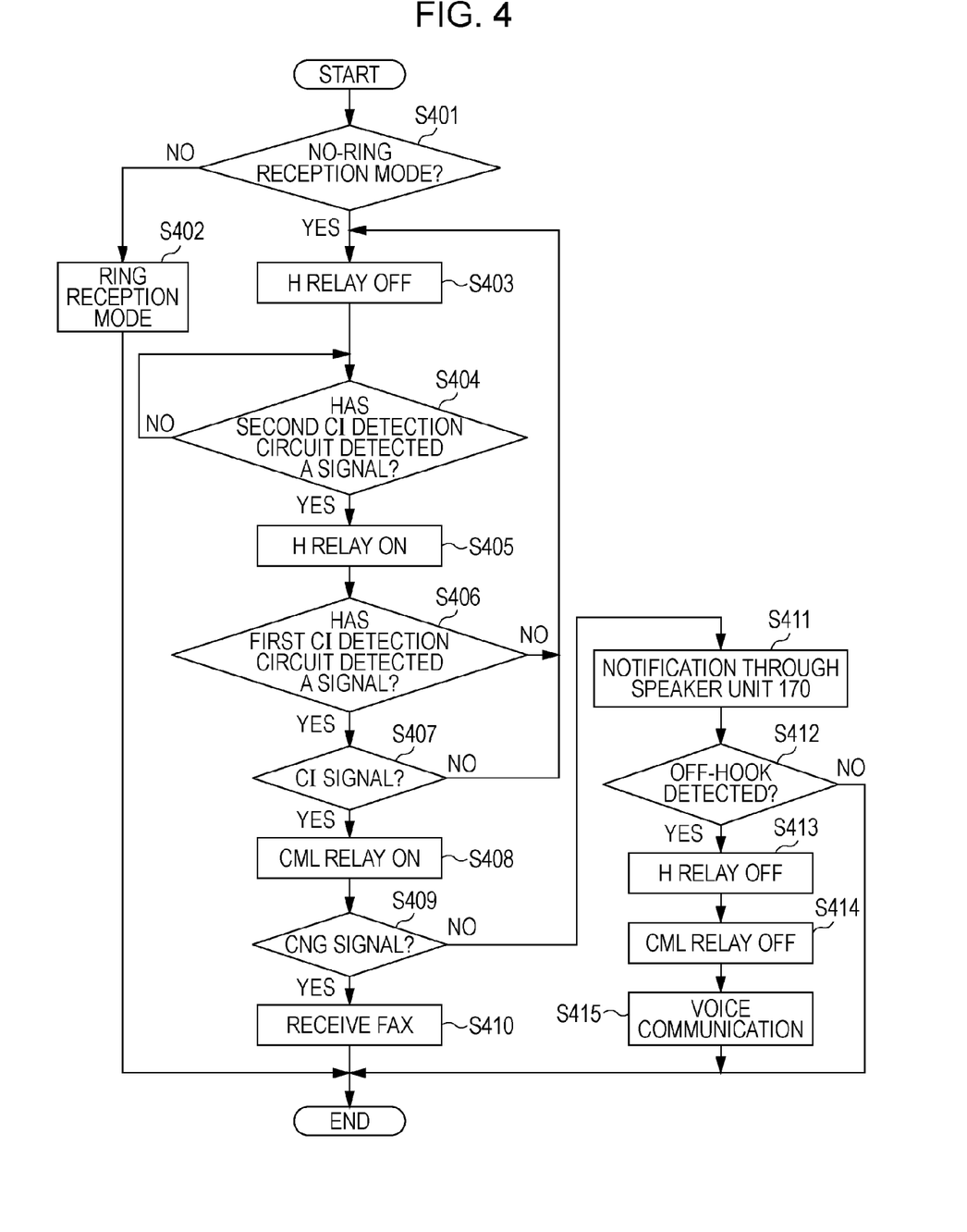
FIG. 4 is a flowchart according to an embodiment of the present invention.

FIG. 4 is a flowchart clearly describing a string of processing in the case of an incoming facsimile in the state that non-ringing incoming mode is set. Note that control for the string of operations in this flowchart is executed by the CPU 111 based on a program stored in the ROM 112.

First, in step S401, determination is made as to whether non-ringing incoming mode is set at the facsimile apparatus. The user of the facsimile apparatus can use the key input unit of the operating unit 140 to select either the ringing incoming mode or non-ringing incoming mode. In step S401, determination is performed based on the selection by this user.

In the case determination is made in step S401 that the non-ringing incoming mode is set, i.e. in the case determination is made that ringing incoming mode is set (NO in step S401), the flow is advanced to step S402, and normal ringing incoming processing is executed. That is to say, as shown in FIG. 2, the apparatus is in standby with both of the CML relay 240 and H relay 250 in the off state, and detection of the CI signal by the CI detecting circuit 280 is performed. In the event a CI signal is detected, i.e. in the case a facsimile or telephone call comes in, the signal is transmitted to the telephone 180, and the telephone 180 is caused to ring. Subsequently, according to instructions from the user, the CML relay is turned in the on state and facsimile communication is executed.

On the other hand, in the case determination is made in step S401 that the non-ringing incoming mode is set (YES in step S401), the flow is advanced to step S403, and the H relay 250 is switched to the off state. Note that in the case that the H relay 250 is already in the off state at the point-in-time that the flow is advanced to step S403, the flow is advanced to step S404 without change. At this stage, with the NCU 100, both of the CML relay 240 and H relay 250 are in the off state, as shown in FIG. 2.

Next, in step S404, detection of a signal by the second detecting circuit 282 is performed. That is to say, the facsimile apparatus is in the state of standby for an incoming facsimile or telephone call. As described above, the second detecting circuit 282 can detect far lower voltage signals as compared to the first detecting circuit 281, so the second detecting circuit 282 can detect a signal sooner than the first detecting circuit 281 can.

In the case determination is made in step S404 that the second detecting circuit 282 has detected a signal from the telephone line (YES in step S404), the flow is advanced to the next step S405, and the H relay 250 is turned in the on state. That is to say, the state of the telephone line interface 210 and telephone interface 220 being connected is switched to the state of being not connected. Thus, the H relay 250 is turned in the on state with a voltage sufficiently lower than the voltage to cause the telephone 180 to ring, whereby the signal transmitted from the telephone line hereafter is not transmitted to the telephone 180, and the telephone 180 does not ring.

Figure 5:
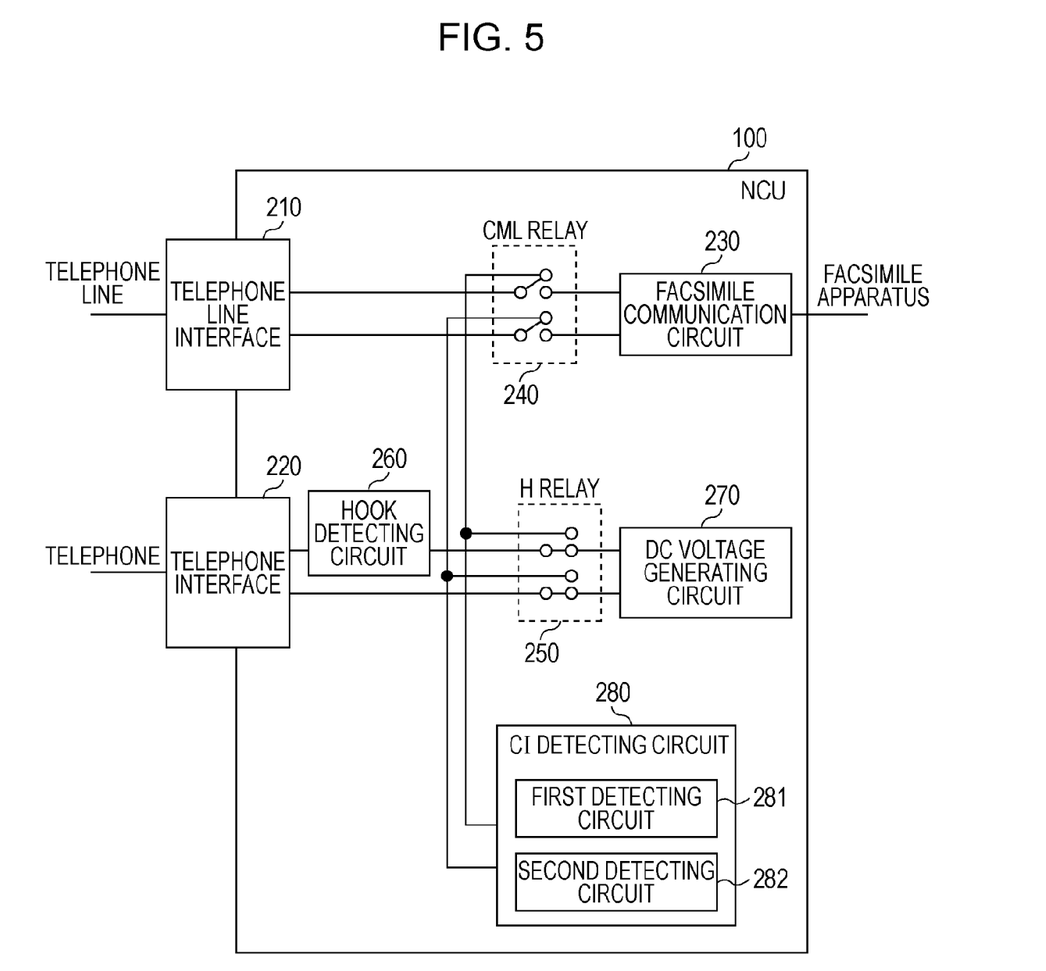
FIG. 5 is a block diagram illustrating a configuration of an NCU according to an embodiment of the present invention.

FIG. 5 shows a state of the NCU 100 after the H relay 250 turned on in step S405. As shown in the diagram, the H relay 250 connects the telephone interface 220 and DC current generating circuit 270. Therefore, the telephone 180 is not connected to the telephone line.

Returning to FIG. 4, in the following step S406, detection of a signal by the first detecting circuit 281 is performed. If the first detecting circuit 281 detects a signal from the telephone line (YES in step S406), the flow is advanced to the following step S407. On the other hand, if a predetermined amount of time passes with the first detecting circuit 281 not detecting a signal from the telephone line (NO in step S406), the flow is returned to step S403, and the H relay 250 comes in the off state again.

In step S407, determination is made as to whether or not the signal transmitted from the telephone line is a CI signal, based on the signal output by the first detecting circuit 281.

A CI signal has a predetermined voltage and pattern. For example, even if a voltage of 30V or greater which the first detecting circuit 281 can detect is transmitted from the telephone line, there may be cases wherein this is simply noise and is not a CI signal. In order to distinguish between such noise and a CI signal, the CI signal is not detected based only on the voltage of the signal transmitted from the telephone line, but detection is the CI signal is performed taking into account the signal pattern.

In the case determination is made in step S407 that the signal that the first detecting circuit 281 has detected is not a CI signal (NO in step S407), the flow is returned to step S403, and the H relay 250 is turned in the off state again. On the other hand, in the case determination is made that the signal that the first detecting circuit 281 has detected is a CI signal (YES in step S407), the flow is advanced to step S408, and the CML relay 240 is turned in the on state.

Figure 6:
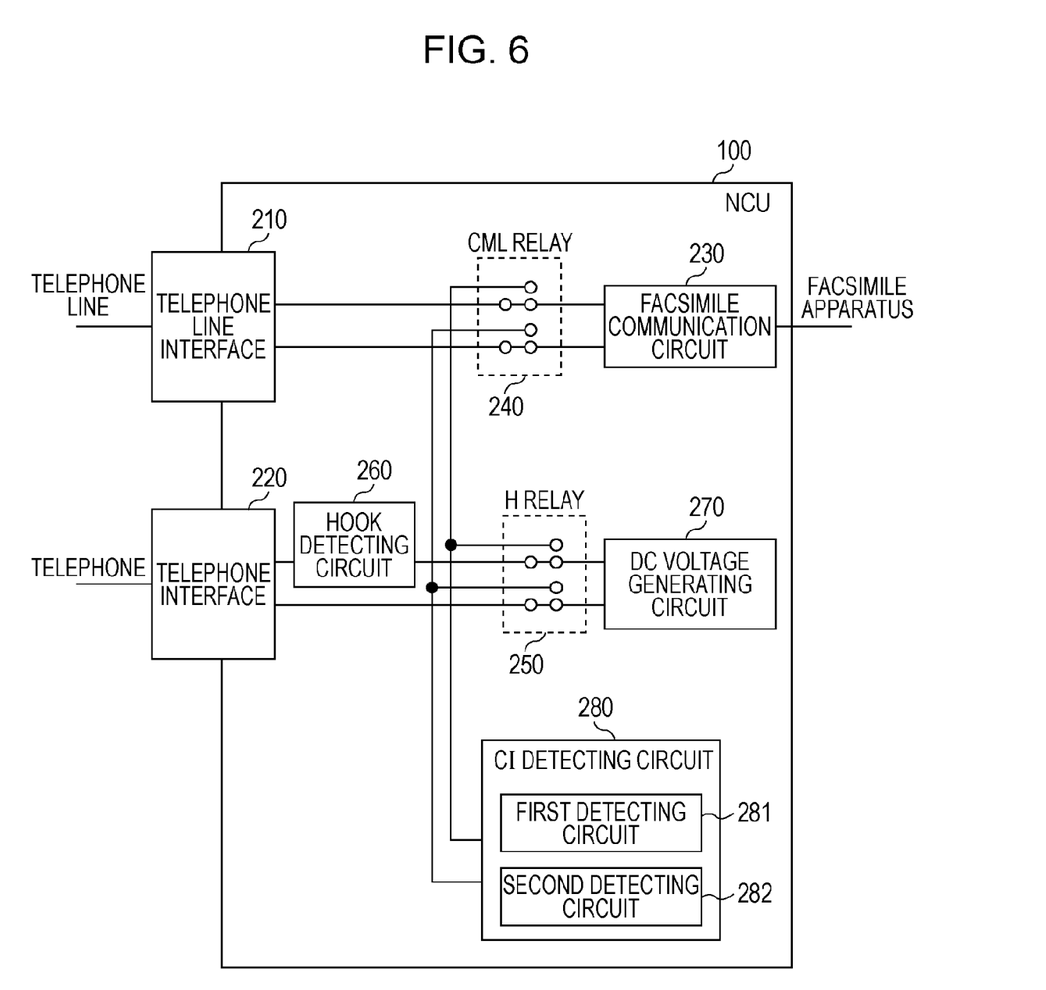
FIG. 6 is a block diagram illustrating a configuration of an NCU according to an embodiment of the present invention.

That is to say, the state of the telephone line interface 210 and facsimile communication circuit 230 (and modem 160) not being connected is switched to a state of being connected. As shown in the drawing, the CML relay 240 connects the facsimile communication line 230 with the telephone line interface 210. Thus, the signals transmitted from the telephone line hereafter are transmitted to the facsimile communication circuit 230.

FIG. 6 shows a state of the NCU 100 following the CML relay 240 being turned in the on state is shown in step S408. Therefore, the telephone 180 and CI detecting circuit 280 are not connected to the telephone line.

In the following step S409, detection of a CNG signal by the facsimile communication circuit 230 is performed. In the case determination is made in step S409 that a CNG signal has been transmitted (YES in step S409), the flow is advanced to step S410, the facsimile data is received from the facsimile apparatus at the transmission source, and the flow is ended.

On the other hand, if a predetermined amount of time passes with the CNG signal not transmitted (NO in step S409), determination is made that the incoming is a telephone call, and in step S411 the speaker unit 170 is caused to ring and notify the caller of an incoming telephone call.

In the following step S412, the telephone 180 being off-hook is detected. The hook detecting circuit 260 uses the voltage generated by the DC voltage generating circuit 270 to detect that the telephone 180 has been taken off-hook.

In the case determination is made that the telephone 180 has been taken off-hook (YES in step S412), the H relay 250 is in the off state in step S413, while the CML relay 240 is turned to the off state in step S414. That is to say, the NCU 100 becomes in the state shown in FIG. 2. Thus, the telephone 180 is connected to the telephone line. In step S415, voice communication using the telephone 180 is then performed.

On the other hand, if a predetermined amount of time passes without the telephone 180 being taken off-hook (NO in step S412), the flow is ended without change.

Figure 7:
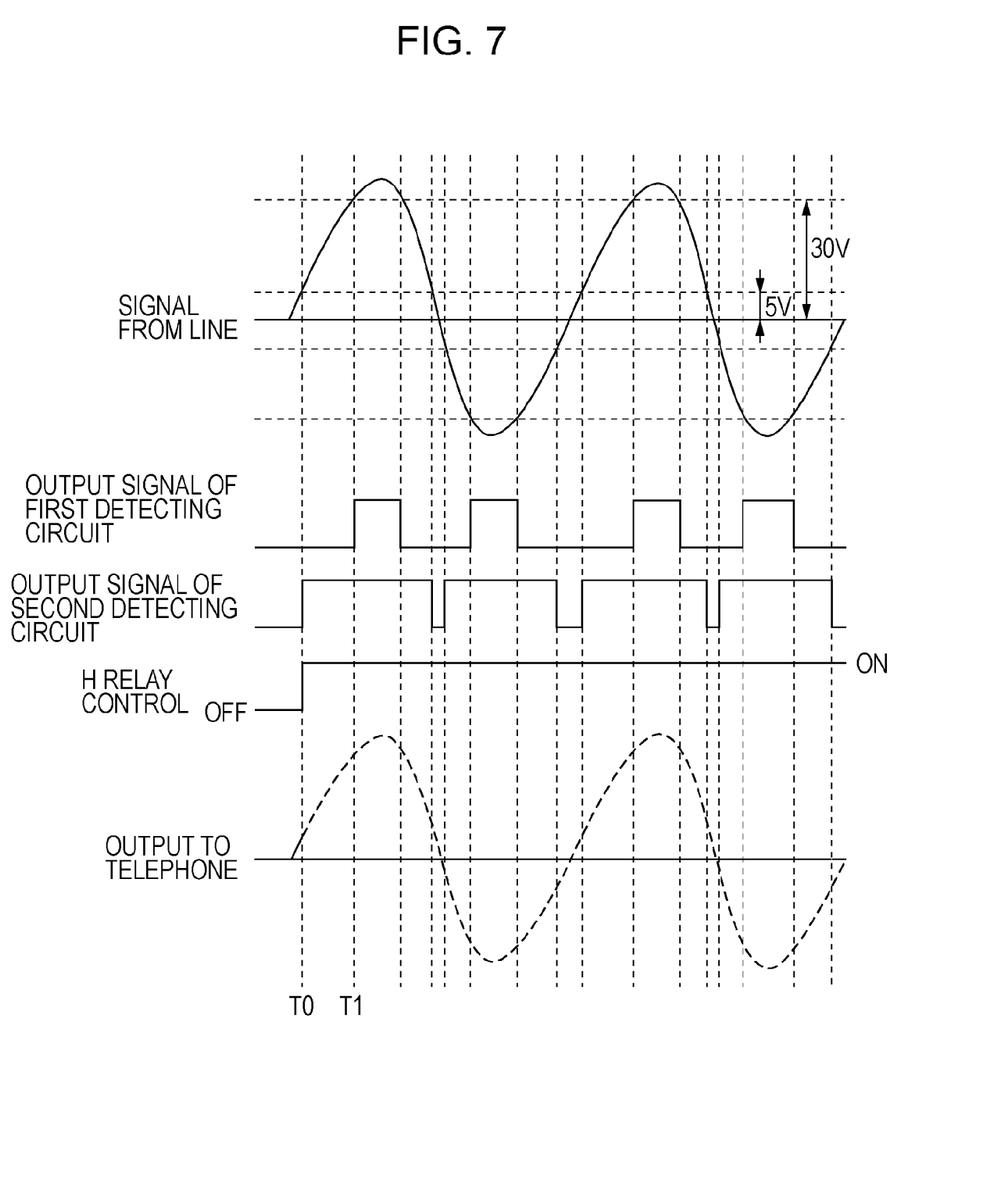
FIG. 7 is a diagram illustrating the relations between a signal transmitted from a telephone line, output signals of various detecting circuits, an H relay control, and output to a telephone, according to an embodiment of the present invention.

FIG. 7 shows the relations of the signal transmitted from the telephone line, the output signal of the first detecting circuit 281, the output signal of the second detecting circuit 282, the H relay 250 control, and the signal transmitted to the telephone 180, in the case that operations according to the flowchart in FIG. 4 are executed.

As shown in FIG. 7, the H relay 250 is turned in the on state in accordance with the second detecting circuit 282 detecting the signal from the telephone line at point-in-time T0. Thus, only a very small amount of signal before the point-in-time T0 is transmitted to the telephone 180, and voltage signals wherein the telephone 180 rings is not transmitted to the telephone 180 (shown in the diagram with a broken line). Thus, the telephone 180 ringing regardless of that this is an incoming facsimile, and the user mistaking the incoming as an incoming telephone call can be prevented.

Note that although not shown in FIG. 7, the CML relay 240 remains in the off state at point-in-time T0. The CML relay 240 is turned in the on state in accordance with the CI signal being detected in step S407 in FIG. 4.

Figure 8:
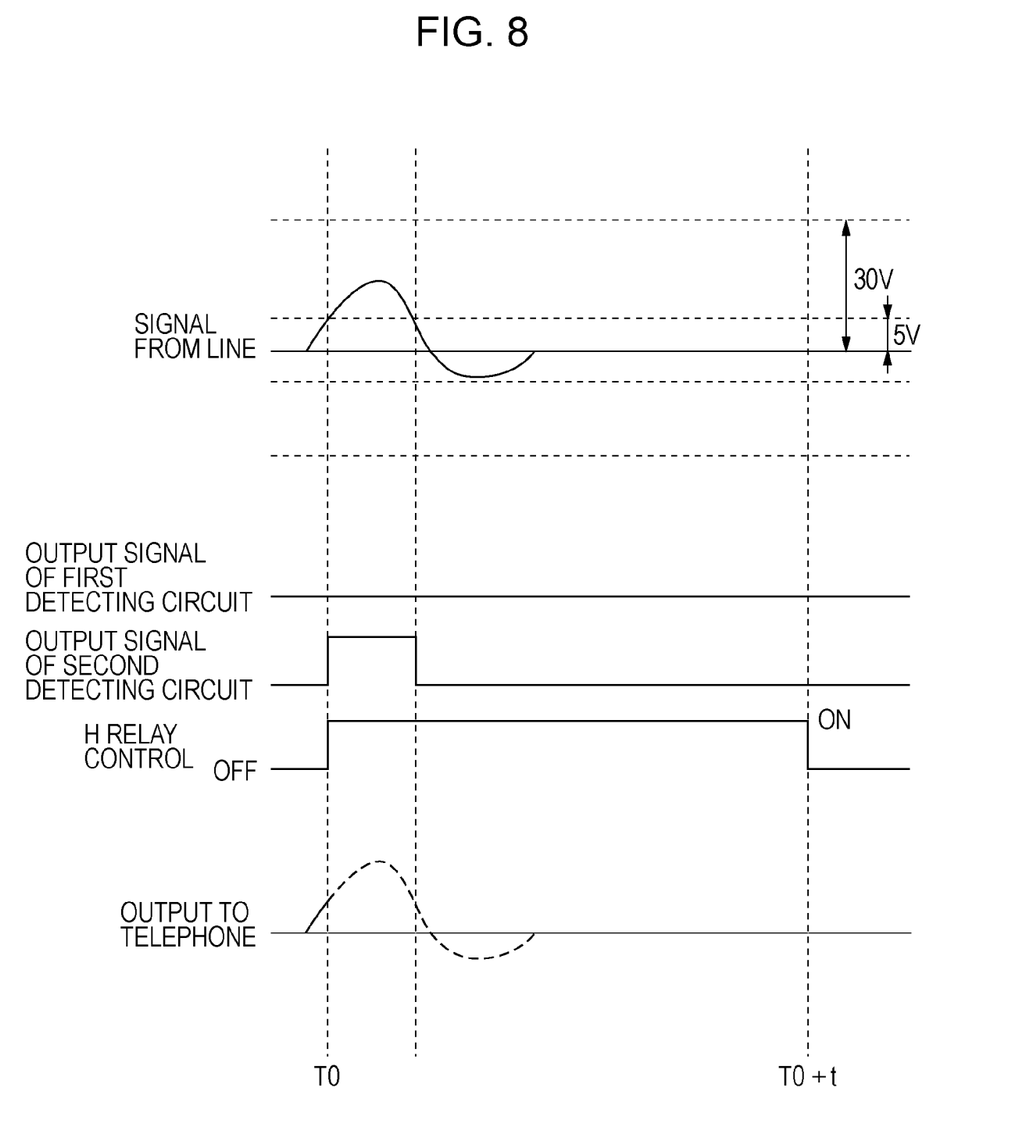
FIG. 8 is a diagram illustrating the relations between a signal transmitted from a telephone line, output signals of various detecting circuits, an H relay control, and output to a telephone, according to an embodiment of the present invention.

FIG. 8 shows the relations of the signal transmitted from the telephone line, the output signal of the first detecting circuit 281, the output signal of the second detecting circuit 282, the H relay 250 control, and the signal transmitted to the telephone 180, in the case that a noise signal is transmitted from the telephone line.

As shown in FIG. 8, the H relay 250 is turned in the on state in accordance with the second detecting circuit 282 detecting the signal from the telephone line at point-in-time T0. Thus, only a very small amount of signal before the point-in-time T0 is transmitted to the telephone 180, so the telephone 180 does not ring.

Also, in the case that the first detecting circuit 281 does not detect a signal even after a predetermined amount of time t has passed following the second detecting circuit 282 having detected the signal from the telephone line, at point-in-time T0+t, the H relay 250 is again turned to the off state.

Note that although now shown in FIG. 7, the CI signal is not detected by the first detecting circuit 281 in this example (No in the step S406 in FIG. 4), so the CML relay 240 remains in the off state.

As described above, according to the present embodiment, the CI detecting circuit 280 provided on the NCU 100 of the facsimile apparatus has two differing detecting circuits of the first detecting circuit 281 and the second detecting circuit 282. In the case that the user has set the non-ringing incoming mode, the apparatus stands by for incoming with the H relay 250 remaining in the off state (S403).

In accordance with the second detecting circuit 282, which detects a signal with voltage lower than the voltage that the first detecting circuit 281 can detect, detecting a signal from the telephone line (S404), the H relay 250 is turned in the on state (S405). Detection of a calling signal is then performed with the first detecting circuit 281 (S407). If a calling signal is not detected, the H relay 250 is turned in the off state (S403). On the other hand, if a calling signal is detected, the CML relay 240 is turned in the on state, and performs facsimile communication or voice communication.

Thus, the power necessary in the standby state in the case of a non-ringing incoming mode is suppressed, and unnecessary ringing of a telephone at the time of the facsimile coming in can be prevented.

Note that with the above description, the voltage detectable by the first detecting unit is 30V and the voltage detectable by the second detecting unit is 5V, but the detectable voltage values can be values other than these.

While an embodiment of the present invention has been described in detail above, the present invention can assume an embodiment of a system, apparatus, method, program, or computer-readable storage medium (recording medium) and so forth. Specifically, the present invention may be applied to a system made up of multiple apparatuses, or may be applied to an apparatus made up of one device.

Note that the present invention supplies a software program that realizes the functions of the above-described embodiments (a program corresponding to a flowchart shown in the diagrams of the embodiments) to a system or apparatus directly or from a distance. This also includes the case wherein a computer of the system or apparatus thereof reads out and executes the supplied program code.

Accordingly, in order to realize the function processing of the present invention with a computer, the program code itself that is installed in the computer also realizes the present invention. That is to say, the present invention includes a computer program itself for realizing the functional processing of the present invention.

In this case, if the computer program has the functions of a program, the program may be in the form of object code, a program executed with an interpreter, script data supplied to the OS, and so forth.

Examples of recording media for supplying a program include a floppy disk, hard disk, optical disc, optical-magnetic disk, MO, CD-ROM, CD-R, CD-RW, magnetic tape, non-volatile memory card, ROM, and DVD (DVD-ROM, DVD-R).

Additionally, a supplying method of the program may be to supply a program by using a browser on a client computer to download from a website on the Internet to a recording medium such as a hard disk. That is to say, the website is accessed, and the computer program itself, or a file that is compressed and includes an automatic install function, according to the present invention is downloaded from the website. Also, the program code making up the program of the present invention can be divided into multiple files, and each file realized by downloading from different websites. That is to say, a WWW server for downloading a program file as to multiple users in order to realize the functional processing of the present invention with a computer is also included in the present invention.

Also, the program of the present invention is encoded and stored in a storage medium such as a CD-ROM and distributed to users. A user having cleared predetermined conditions can then download key information to decode the encoding from the website via the Internet. The key information therein can be used to execute the encoded program, thereby installing on the computer and executing.

Also, the computer executes the read out program, whereby the above-described functions of the embodiments can be realized. Additionally, based on the program instructions, the OS operating on the computer and so forth can perform a portion or all of the actual processing, whereby with such processing the above-described functions of the embodiments can be realized.

Further, the above-described embodiment functions can be realized even after the program read out from the recording medium is written into memory provided on a function expansion board installed on the computer or a function expansion unit connected to the computer. That is to say, based on the program instructions thereof, the above-described functions of the embodiments can be realized by the CPU provided with the function expansion board or function expansion unit performing a portion or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-323680 filed Dec. 14, 2007, which is hereby incorporated by reference herein in its entirety.

What is claimed is:

1. A line control apparatus having a first interface for connecting to a telephone line, a second interface for connecting to a facsimile apparatus, and a third interface for connecting to a telephone, the line control apparatus comprising:
a second detecting unit configured to detect a signal from the telephone line, wherein the second detecting unit detects the signal with a voltage lower than a voltage that a first detecting unit can detect;
a first switching unit configured to switch a connection state between the first interface and the third interface;
a control unit configured to control the first switching unit so as to switch from a first state wherein the first interface and the third interface are connected to a second state of not being connected, in accordance with the second detecting unit having detected the signal from the telephone line; and
the first detecting unit configured to detect the signal from the telephone line following the first switching unit having switched from the first state to the second state.

2. The line control apparatus according to claim 1, wherein, in accordance with the second detecting unit having detected a signal from the telephone line, in the case that the first detecting unit does not detect a signal from the telephone line following the first switching unit having switched from the first state to the second state, the control unit controls the first switching unit so as to return from the second state to the first state.

3. The line control apparatus according to claim 1, further comprising:
a determining unit configured to determine whether or not the signal detected by the first detecting unit is a calling signal, based on the voltage and pattern of the signal detected by the first detecting unit.

4. The line control apparatus according to claim 3, wherein, in accordance with the second detecting unit having detected a signal from the telephone line, in the case that the first detecting unit detects a signal from the telephone line following the first switching unit having switched from the first state to the second state, and determination is made by the determining unit that the signal detected by the first detecting unit is not a calling signal, the control unit controls the first switching unit so as to return from the second state to the first state.

5. The line control apparatus according to claim 3, further comprising: a second switching unit configured to switch the connection state between the first interface and the second interface;
wherein, in accordance with determination made by the determining unit that the signal detected by the first detecting unit is a calling signal, the control unit controls the second switching unit so as to switch from a third state wherein the first interface and the second interface are not connected to a fourth state of being connected.

6. The line control apparatus according to Claim 5, wherein the second switching unit turns a second relay to an on state whereby the first interface and the second interface are in the fourth state;
and wherein the second relay is turned to an off state whereby the first interface and the second interface are in the third state.

7. The line control apparatus according to claim 1, wherein the first switching unit turns a first relay to an on state whereby the first interface and the third interface are in the second state;
and wherein the first relay is turned to an off state whereby the first interface and the third interface are in the first state.

8. The line control apparatus according to claim 1, wherein the first detecting unit and the second detecting unit are mutually differing first detecting circuit and second detecting circuit.

9. The line control apparatus according to claim 8, wherein the first detecting circuit and the second detecting circuit are arrayed so as to be connected in a parallel manner.

10. A line control method for a line control apparatus having a first interface for connecting to a telephone line, a second interface for connecting to a facsimile apparatus, and a third interface for connecting to a telephone, the method comprising:
a second detecting process arranged to detect a signal from the telephone line, wherein the second detecting process detects the signal with a voltage lower than a voltage that can be detected with a first detecting process;

a first switching process arranged to switch a connection state between the first interface and the third interface;

a control process arranged to control the first switching process so as to switch from a first state wherein the first interface and the third interface are connected to a second state of not being connected, in accordance with the signal from the telephone line having been detected by the second detecting process; and the first detecting process arranged to detect the signal from the telephone line following the first interface and the third interface being switched from the first state to the second state.

11. The line control method according to claim 10, wherein, in accordance with a signal from the telephone line being detected by the second detecting process, in the case that a signal from the telephone line is not detected with the first detecting process following the first interface and the third interface being switched from the first state to the second state, the first switching process is controlled in the control process so as to return from the second state to the first state.

12. The line control method according to claim 10, further comprising:

a determining process wherein determination is made as to whether or not the signal detected in the first detecting process is a calling signal, based on the voltage and pattern of the signal detected by the first detecting process.

13. The line control method according to claim 12, wherein, in accordance with a signal from the telephone line being detected by the second detecting process, in the case that a signal from the telephone line is detected with the first detecting process following the first interface and the third interface being switched from the first state to the second state and determination is made in the determining process that the signal detected in the first detecting process is not a calling signal, the first switching process is controlled in the control process so as to return from the second state to the first state.

14. The line control method according to claim 12, further comprising:

a second switching process wherein the connection state between the first interface and the second interface is switched;

wherein, in accordance with determination made by in determining process that the signal detected in the first detecting process is a calling signal, the second switching process is controlled with the control process so as to switch from a third state wherein the first interface and the second interface are not connected to a fourth state of being connected.

15. The line control method according to claim 14, wherein, with the second switching process, a second relay is turned to an on state whereby the first interface and the second interface are in the fourth state;

and wherein the second relay is turned to an off state whereby the first interface and the second interface are in the third state.

16. The line control method according to claim 10, wherein, with the first switching process, a first relay is turned to an on state whereby the first interface and the third interface are in the second;

and wherein the first relay is turned to an off state whereby the first interface and the third interface are in the first state.

17. The line control method according to claim 10, wherein with the first detecting process and the second detecting process, a signal from the telephone line is detected employing mutually differing first detecting circuit and second detecting circuit.

18. The line control method according to claim 17, wherein the first detecting circuit and the second detecting circuit are arrayed so as to be connected in a parallel manner.

19. A computer-readable storage medium having stored a program configured to cause a computer to execute the line control method according to claim 10.

* * * * *